United States Patent
Kim

(10) Patent No.: US 11,416,401 B2
(45) Date of Patent: Aug. 16, 2022

(54) MEMORY SYSTEM AND OPERATING METHOD THEREOF

(71) Applicant: SK hynix Inc., Icheon-si (KR)

(72) Inventor: Do Hun Kim, Icheon-si (KR)

(73) Assignee: SK hynix Inc., Icheon-si (KR)

( * ) Notice: Subject to any disclaimer, the term of this patent is extended or adjusted under 35 U.S.C. 154(b) by 0 days.

(21) Appl. No.: 17/183,201

(22) Filed: Feb. 23, 2021

(65) Prior Publication Data

US 2022/0083471 A1 Mar. 17, 2022

(30) Foreign Application Priority Data

Sep. 14, 2020 (KR) .................... 10-2020-0117455

(51) Int. Cl.
| | | |
|---|---|---|
| G06F 12/08 | (2016.01) | |
| G06F 12/02 | (2006.01) | |
| G06F 12/0815 | (2016.01) | |
| G06F 12/0891 | (2016.01) | |

(52) U.S. Cl.
CPC ...... *G06F 12/0815* (2013.01); *G06F 12/0246* (2013.01); *G06F 12/0891* (2013.01); *G06F 2212/1021* (2013.01)

(58) Field of Classification Search
None
See application file for complete search history.

(56) References Cited

U.S. PATENT DOCUMENTS

| | | | | |
|---|---|---|---|---|
| 2010/0332730 | A1* | 12/2010 | Royer, Jr | G06F 12/0246 711/E12.008 |
| 2017/0075813 | A1* | 3/2017 | Kaburaki | G06F 12/0895 |
| 2017/0091104 | A1* | 3/2017 | Rafacz | G06F 12/0862 |
| 2017/0364446 | A1* | 12/2017 | Pham | G06F 12/1009 |
| 2019/0155723 | A1* | 5/2019 | Park | G06F 12/0246 |
| 2019/0220416 | A1* | 7/2019 | Jung | G06F 12/0246 |
| 2019/0235762 | A1* | 8/2019 | Kaburaki | G06F 12/0864 |
| 2020/0034298 | A1* | 1/2020 | Benisty | G06F 12/0873 |
| 2020/0301847 | A1* | 9/2020 | Miura | G06F 12/1009 |

FOREIGN PATENT DOCUMENTS

| | | |
|---|---|---|
| KR | 10-1422557 | 8/2014 |
| KR | 10-2018-0124708 A | 11/2018 |

OTHER PUBLICATIONS

Xie et al. (Exploiting Internal Parallelism for Address Translation in Solid State Drives, pub. 2017), ACM Transactions on Storage vol. 0. pp. 31 (Year: 2017).*

* cited by examiner

*Primary Examiner* — Kaushikkumar M Patel
(74) *Attorney, Agent, or Firm* — Perkins Coie LLP

(57) ABSTRACT

Embodiments of the disclosed technology relate to a memory system and an operating method thereof. According to the embodiments of the disclosed technology, the memory system may check N flag sets corresponding to N cache lines configured to cache map data,—Each flag set includes M flags, each flag indicating whether or not a cache hit for indicating a particular piece of data being stored in the map cache has been made for each of the M data units included in a corresponding cache line—may check target map data based on a number of flags indicating the cache hit for a corresponding data unit and included in the first flag set corresponding to the first cache line among the N cache lines.

13 Claims, 15 Drawing Sheets

MEMORY SYSTEM AND OPERATING METHOD THEREOF

CROSS-REFERENCE TO RELATED APPLICATION

This patent document claims the priority and benefits of Korean Patent Application No. 10-2020-0117455 filed in the Korean Intellectual Property Office on Sep. 14, 2020, which is incorporated herein by reference in its entirety.

TECHNICAL FIELD

The embodiments of the disclosed technology relate to a memory system and an operating method thereof.

BACKGROUND

A memory system can include a storage device to store data. Such a memory system can operate on the basis of a request from a host, such as computers, mobile devices (for example, a smartphone or a tablet), or other similar electronic devices. The examples of the memory system may span from a traditional hard disk drive (HDD) to a semiconductor-based data storage device such as a solid state drive (SSD), a universal flash storage device (UFS), or an embedded MMC (eMMC) device.

The memory system may further include a memory controller for controlling the memory device. The memory controller may receive a command from the host and execute the command or control read/write/erase operations on the memory device included in the memory system. The memory controller may also be used to run firmware for performing a logical operation for controlling such operations.

The memory system may manage map data for performing an operation of reading, writing and erasing data in a memory device. The memory system may include a map cache for caching the map data to quickly access the map data.

SUMMARY

Embodiments of the disclosed technology may provide a memory system and an operating method thereof capable of increasing the hit ratio of the map cache by caching map data with high probability of being accessed in the map cache in advance.

In addition, embodiments of the disclosed technology may provide a memory system and an operating method thereof capable of quickly processing requests received from hosts by increasing the hit ratio of the map cache.

In one aspect, embodiments of the disclosure may provide a memory system comprising a memory device, and a memory controller in communication with the memory device and configured to control the memory device. The memory controller may comprise a map cache including N cache lines configured to cache map data, wherein each of the N cache lines includes M data units, N and M being positive integers equal to or greater than 2.

In some implementations, the memory controller may comprise a cache line control circuit in communication with the map cache and configured to control N flag sets corresponding to the N cache lines, wherein each of the N flag sets includes M flags. Each flag may indicate whether or not a cache hit for indicating a particular piece of data being stored in the map cache has been made for each of the M data units included in a corresponding cache line.

The cache line control circuit may check target map data based on a number of flags indicating the cache hit for a corresponding data unit and included in a first flag set corresponding to a first cache line among the N cache lines.

In some implementations, the cache line control circuit may read the target map data from the memory device and cache the target map data in a second cache line among the N cache lines.

In another aspect, an operating method of the memory system may be provided. The operating method of the memory system may comprise checking N flag sets corresponding to N cache lines configured to cache map data and include M data unit. Each of the N flag sets may contain M flags. Each of the M flags may indicate whether a cache hit for indicating a particular piece of data being stored in the map cache has been made for each of the M data units included in a corresponding cache line. In this case, N and M may be positive integers equal to or greater than 2.

The operating method of the memory system may comprise checking target map data based on a number of flags indicating the cache hit for a corresponding data unit and included in a flag set corresponding to a first cache line among the N cache lines.

The operating method of the memory system may comprise performing caching the target map data in a second cache line among the N cache lines or skipping caching of the target map data.

According to the embodiments of the disclosure, it is possible to increase the hit ratio of the map cache by caching map data with high probability of being accessed in the map cache in advance. According to the embodiments of the disclosure, it is possible to quickly process requests received from hosts by increasing the hit ratio of the map cache.

DETAILED DESCRIPTION

Hereinafter, embodiments of the disclosed technology are described in detail with reference to the accompanying drawings. Throughout the specification, reference to "an embodiment," "another embodiment" or the like is not necessarily to only one embodiment, and different references to any such phrase are not necessarily to the same embodiment(s). The term "embodiments" when used herein does not necessarily refer to all embodiments.

Figure 1:
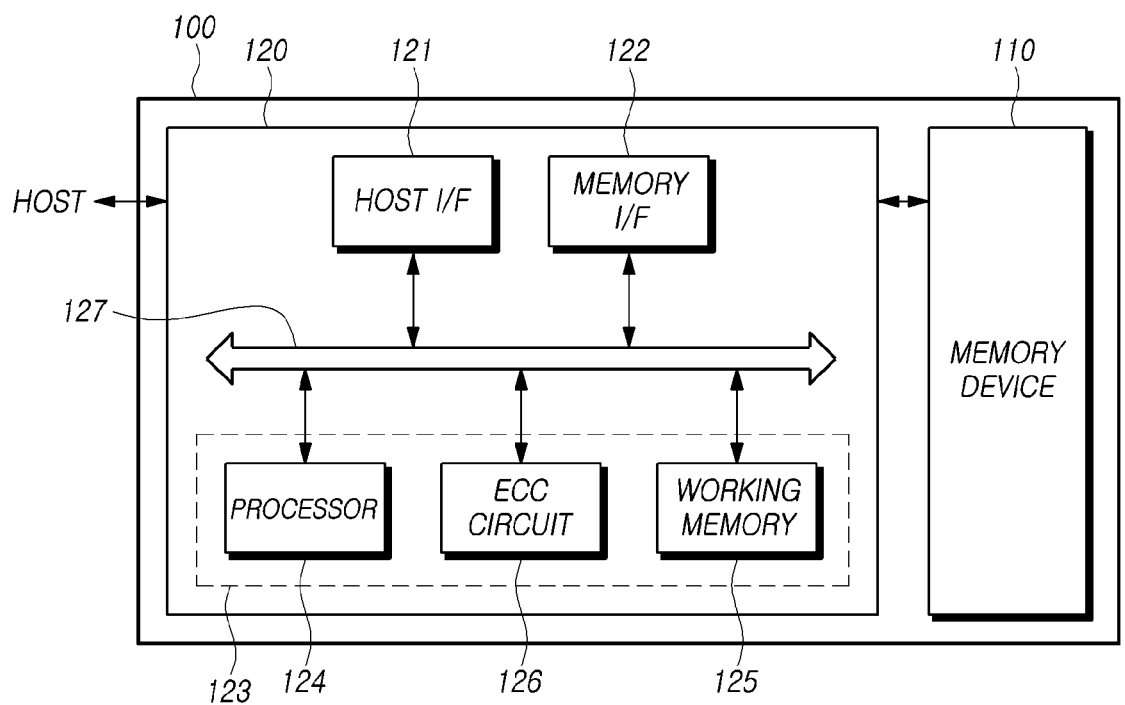
FIG. 1 is a schematic diagram illustrating a configuration of a memory system according to an embodiment of the disclosed technology.

FIG. 1 is a diagram illustrating the schematic configuration of a memory system 100 based on an embodiment of the disclosed technology.

In some implementations, the memory system 100 may include a memory device 110 configured to store data, and a memory controller 120 configured to control the memory device 110.

The memory device 110 may include multiple memory blocks each including a predetermined number of memory cells for storing data. The memory device 110 may be configured to operate in response to control signals received from the memory controller 120. Operations of the memory device 110 may include, for example, a read operation, a program operation (also referred to as a "write operation"), and an erasure operation.

The memory cells in the memory device 110 are used to store data and may be arranged in a memory cell array. In some implementations where the memory device 110 is a flash memory device, the memory cell array may be divided into memory blocks of memory cells and each block includes different pages of memory cells. In some implementations of NAND flash memory devices, a page of cells is the smallest memory unit that can be programmed (or written) and read, and the data stored in memory cells can be erased at the block level.

In some implementations, the memory device 110 may be implemented as various types, such as a double data rate synchronous dynamic random access memory (DDR SDRAM), a low power double data rate fourth generation (LPDDR4) SDRAM, a graphics double data rate (GDDR) SDRAM, a low power DDR (LPDDR), a rambus dynamic random access memory (RDRAM), a NAND flash memory, a vertical NAND flash memory, a NOR flash memory, a resistive random access memory (RRAM), a phase-change memory (PRAM), a magnetoresistive random access memory (MRAM), a ferroelectric random access memory (FRAM), or a spin transfer torque random access memory (SU-RAM).

The memory device 110 may be implemented in a three-dimensional array structure. Some embodiments of the disclosed technology are applicable to any type of flash memory devices having an electric charge storage layer. In an implementation, the electric charge storage layer may be formed of a conductive material, and such an electric charge storage layer can be called a floating gate. In another implementations, the electric charge storage layer may be formed of an insulating material, and such a flash memory device can be called a charge trap flash (CTF).

The memory device 110 may be configured to receive a command and an address from the memory controller 120 to access an area of the memory cell array selected using the address. That is, the memory device 110 may perform an operation corresponding to the received command on a memory area in the memory device having a physical address corresponding to the received address from the controller.

In some implementations, the memory device 110 may perform, among others, a program operation, a read operation, and an erasure operation. During the program operation, the memory device 110 may write ("program") data to the area selected by the address. During the read operation, the memory device 110 may read data from a memory area selected by the address. During the erasure operation, the memory device 110 may erase data stored in a memory area selected by the address.

The memory controller 120 may control write (program), read, erasure, and background operations to be performed on the memory device 110. The background operation may include operations that are implemented to optimize the overall performance of the memory device 110, such as a garbage collection operation (GC), a wear leveling (WL) operation, and a bad block management (BBM) operation.

The memory controller 120 may control the operation of the memory device 110 at the request of a host. Alternatively, the memory controller 120 may control the operation of the memory device 110 even in absence of request from the host when it performs such a background operation of the memory device.

The memory controller 120 and the host may be separate devices. In some implementations, the memory controller 120 and the host may be integrated in a single device. In the following description, as an example, the memory controller 120 and the host are separate devices.

Referring to FIG. 1, the memory controller 120 may include a memory interface 122, a control circuit 123, and a host interface 121.

The host interface 121 may be configured to provide an interface for communication with the host.

When receiving a command from the host HOST, the control circuit 123 may receive the command through the host interface 121 and may perform an operation of processing the received command.

The memory interface 122 may be directly or indirectly connected to the memory device 110 to provide an interface for communication with the memory device 110. That is, the memory interface 122 may be configured to provide the memory device 110 and the memory controller 120 with an interface for the memory controller 120 to perform memory operations on the memory device 110 based on control signals and instructions from the control circuit 123.

The control circuit 123 may be configured to control the operation of the memory device 110 through the memory controller 120. For example, the control circuit 123 may include a processor 124 and a working memory 125. The control circuit 123 may further include an error detection/correction circuit (ECC circuit) 126.

The processor 124 may control the overall operation of the memory controller 120. The processor 124 may perform a logical operation. The processor 124 may communicate with the host HOST through the host interface 121. The processor 124 may communicate with the memory device 110 through the memory interface 122.

The processor 124 may be used to run a flash translation layer (FTL) to effectively manage the memory operations on the memory system 100. For example, the processor 124 may translate a logical block address (LBA) provided by the host into a physical block address (PBA) through the FTL. The FTL may receive the LBA and translate the LBA into the PBA by using a mapping table.

There are various address mapping methods which may be employed by the FTL, based on the mapping unit. Typical address mapping methods may include a page mapping method, a block mapping method, and a hybrid mapping method.

The processor 124 may be configured to randomize data received from the host to write the randomized data to the memory cell array. For example, the processor 124 may randomize data received from the host by using a randomizing seed. The randomized data is provided to the memory device 110 and written to the memory cell array.

The processor 124 may be configured to derandomize data received from the memory device 110 during a read operation. For example, the processor 124 may derandomize data received from the memory device 110 by using a derandomizing seed. The derandomized data may be output to the host HOST.

The processor 124 may execute firmware (FW) to control the operation of the memory controller 120. In other words, the processor 124 may control the overall operation of the memory controller 120 and, in order to perform a logical operation, may execute (drive) firmware loaded into the working memory 125 during booting.

The firmware refers to a program or software stored on a certain nonvolatile memory and is executed inside the memory system 100.

In some implementations, the firmware may include various functional layers. For example, the firmware may include at least one of a flash translation layer (FTL) configured to translate a logical address in the host HOST requests to a physical address of the memory device 110, a host interface layer (HIL) configured to interpret a command that the host HOST issues to a data storage device such as the memory system 100 and to deliver the command to the FTL, and a flash interface layer (FIL) configured to deliver a command issued by the FTL to the memory device 110.

For example, the firmware may be stored in the memory device 110, and then loaded into the working memory 125.

The working memory 125 may store firmware, program codes, commands, or pieces of data necessary to operate the memory controller 120. The working memory 125 may include, for example, at least one among a static RAM (SRAM), a dynamic RAM (DRAM), and a synchronous RAM (SDRAM) as a volatile memory.

The error detection/correction circuit 126 may be configured to detect and correct one or more erroneous bits in the data by using an error detection and correction code. In some implementations, the data that is subject to the error detection and correction may include data stored in the working memory 125, and data retrieved from the memory device 110.

The error detection/correction circuit 126 may be implemented to decode data by using the error correction code. The error detection/correction circuit 126 may be implemented by using various decoding schemes. For example, a decoder that performs nonsystematic code decoding or a decoder that performs systematic code decoding may be used.

In some implementations, the error detection/correction circuit 126 may detect one or more erroneous bits on a sector basis. That is, each piece of read data may include multiple sectors. In the context of this patent document, a "sector" may refer to a data unit that is smaller than the smallest unit for read operations (e.g., page) of a flash memory. Sectors constituting each piece of read data may be mapped based addresses.

In some implementations, the error detection/correction circuit 126 may calculate a bit error rate (BER) and determine whether the number of erroneous bits in the data is within the error correction capability sector by sector. For example, if the BER is higher than a reference value, the error detection/correction circuit 126 may determine that the erroneous bits in the corresponding sector are uncorrectable and the corresponding sector is marked "fail." If the BER is lower than the reference value, the error detection/correction circuit 126 may determine that the corresponding sector is correctable and the corresponding sector can be marked "pass."

The error detection/correction circuit 126 may perform error detection and correction operations successively on all read data. When a sector included in the read data is correctable, the error detection/correction circuit 126 may go on to the next sector to check as to whether an error correction operation is needed on the next sector. Upon completion of the error detection and correction operations on all the read data in this manner, the error detection/correction circuit 126 may identify which sector is deemed uncorrectable in the read data. The error detection/correction circuit 126 may provide information (e.g., address of uncorrectable sector) regarding the sectors deemed uncorrectable to the processor 124.

The memory system 100 may also include a bus 127 to provide a channel between the constituent elements 121, 122, 124, 125, and 126 of the memory controller 120. The bus 127 may include, for example, a control bus for delivering various types of control signals and commands, and a data bus for delivering various types of data.

The above-mentioned constituent elements 121, 122, 124, 125, and 126 of the memory controller 120 are illustrated in FIG. 1 by way of example. It is noted that some of the above-mentioned constituent elements 121, 122, 124, 125, and 126 of the memory controller 120 may be omitted, or some of the above-mentioned constituent elements 121, 122, 124, 125, and 126 of the memory controller 120 may be integrated into a single element. In addition, in some implementations, one or more other constituent elements may be added to the above-mentioned constituent elements of the memory controller 120.

Hereinafter, the memory device 110 will be described in more detail with reference to FIG. 2.

Figure 2:
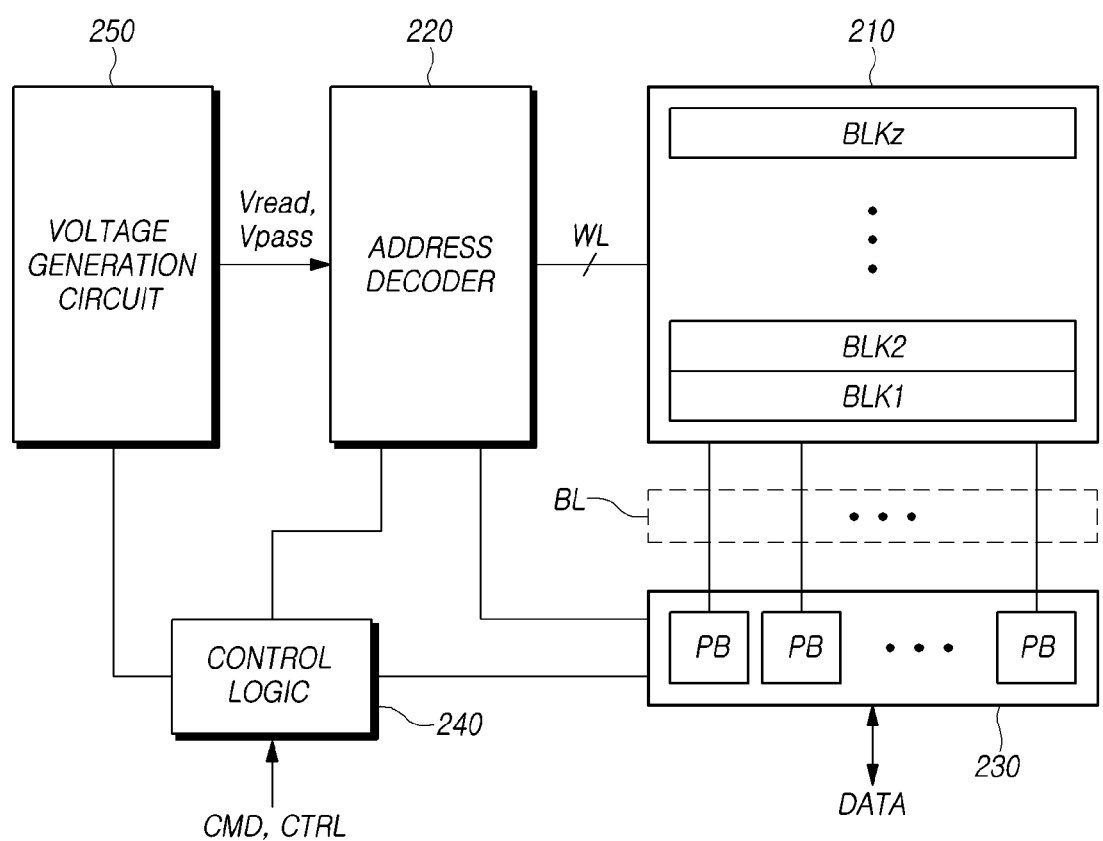
FIG. 2 is a block diagram schematically illustrating a memory device according to an embodiment of the disclosed technology.

FIG. 2 is a block diagram schematically illustrating a memory device 110 based on an embodiment of the disclosed technology.

In some implementations, the memory device 110 based on an embodiment of the disclosed technology may include a memory cell array 210, an address decoder 220, a read/write circuit 230, a control logic 240, and a voltage generation circuit 250.

The memory cell array 210 may include multiple memory blocks BLK1-BLKz, where z is a natural number equal to or larger than 2.

In the multiple memory blocks BLK1-BLKz, multiple word lines WL and multiple bit lines BL may be arranged in rows and columns, and multiple memory cells MC may be arranged.

The multiple memory blocks BLK1-BLKz may be connected to the address decoder 220 through the multiple word lines WL. The multiple memory blocks BLK1-BLKz may be connected to the read/write circuit 230 through the multiple bit lines BL.

Each of the multiple memory blocks BLK1-BLKz may include multiple memory cells. For example, the multiple memory cells are nonvolatile memory cells. In some implementations, such nonvolatile memory cells may be arranged in a vertical channel structure.

The memory cell array 210 may be configured as a memory cell array having a two-dimensional structure and, in some implementations, may be arranged in a three-dimensional structure.

Each of the multiple memory cells included in the memory cell array 210 may store at least one bit of data. For example, each of the multiple memory cells included in the memory cell array 210 may be a single-level cell (SLC) configured to store one bit of data per memory cell. As another example, each of the multiple memory cells included in the memory cell array 210 may be a multi-level cell (MLC) configured to store two bits of data per memory cell. As another example, each of the multiple memory cells included in the memory cell array 210 may be a triple-level cell (TLC) configured to store three bits of data per memory cell. As another example, each of the multiple memory cells included in the memory cell array 210 may be a quad-level cell (QLC) configured to store four bits of data. As another example, the memory cell array 210 may include multiple memory cells that are configured to store at least five bits of data per memory cell.

Referring to FIG. 2, the address decoder 220, the read/write circuit 230, the control logic 240, and the voltage generation circuit 250 may operate as peripheral circuits configured to drive the memory cell array 210.

The address decoder 220 may be connected to the memory cell array 210 through the multiple word lines WL.

The address decoder 220 may be configured to operate in response to commands and control signals of the control logic 240.

The address decoder 220 may receive addresses through an input/output buffer inside the memory device 110. The address decoder 220 may be configured to decode a block address among the received addresses. The address decoder 220 may select at least one memory block based on the decoded block address.

The address decoder 220 may receive a read voltage Vread and a pass voltage Vpass from the voltage generation circuit 250.

The address decoder 250 may apply the read voltage Vread to a selected word line WL inside a selected memory block, when applying the read voltage during a read operation, and may apply the pass voltage Vpass to the remaining non-selected word lines WL.

The address decoder 220 may apply a verification voltage generated by the voltage generation circuit 250 to a selected word line WL inside a selected memory block, during a program verification operation, and may apply the pass voltage Vpass to the remaining non-selected word lines WL.

The address decoder 220 may be configured to decode a column address among the received addresses. The address decoder 220 may transmit the decoded column address to the read/write circuit 230.

The memory device 110 may perform the read operation and the program operation on a page by page basis. Addresses received when the read operation and the program operation are requested may include at least one of a block address, a row address, and a column address.

The address decoder 220 may select one memory block and one word line based on the block address and the row address. The column address may be decoded by the address decoder 220 and provided to the read/write circuit 230.

The address decoder 220 may include at least one of a block decoder, a row decoder, a column decoder, and an address buffer.

The read/write circuit 230 may include multiple page buffers PB. The read/write circuit 230 may operate as a "read circuit" when the memory cell array 210 performs a read operation, and may operate as a "write circuit" when the memory cell array 210 performs a write operation.

The above-mentioned read/write circuit 230 is also referred to as a page buffer circuit including multiple page buffers PB, or a data register circuit. The read/write circuit 230 may include a data buffer that can hold data for data processing and, in some implementations, may further include a cache buffer for data caching.

The multiple page buffers PB may be connected to the memory cell array 210 through the multiple bit lines BL. In order to detect or sense the threshold voltage Vth of the memory cells during a read operation and a program verification operation, the multiple page buffers PB may continuously supply a sensing current to the bit lines BL connected to the memory cells to detect, at a sensing node, a change in the amount of current that flows based on the program state of a corresponding memory cell, and may hold or latch the corresponding voltage as sensing data.

The read/write circuit 230 may operate in response to page buffer control signals output from the control logic 240.

During a read operation, the read/write circuit 230 senses a voltage value of a memory cell and the voltage value is read out as data. The read/write circuit 230 temporarily stores the retrieved data, and outputs the data DATA to the input/output buffer of the memory device 110. In an embodiment, the read/write circuit 230 may include a column selection circuit, in addition to the page buffers PB or page registers.

The control logic 240 may be connected to the address decoder 220, the read/write circuit 230, and the voltage generation circuit 250. The control logic 240 may receive a command CMD and a control signal CTRL through the input/output buffer of the memory device 110.

The control logic 240 may be configured to control the overall operation of the memory device 110 in response to the control signal CTRL. The control logic 240 may output a control signal for adjusting the voltage level at sensing nodes of multiple page buffers PB.

The control logic 240 may control the read/write circuit 230 to perform a read operation on the memory cells in the memory cell array 210. The voltage generation circuit 250 may generate a read voltage Vread and a pass voltage Vpass, which are used during the read operation, in response to a voltage generation circuit control signal provided by the control logic 240.

A memory block BLK included in the memory device 110 may consist of multiple pages PG, each of which includes a plurality of memory cells. In some implementations, the plurality of memory cells can be arranged in multiple strings. The multiple pages PG can be mapped to multiple word lines WL, and the multiple strings STR can be mapped to multiple bit lines BL.

In the memory block BLK, multiple word lines WL and multiple bit lines BL may be arranged in rows and columns. For example, each of the multiple word lines WL may be arranged in the row direction, and each of the multiple bit lines BL may be arranged in the column direction. As another example, each of the multiple word lines WL may be arranged in the column direction, and each of the multiple bit lines BL may be arranged in the row direction.

The multiple word lines WL and the multiple bit lines BL may intersect with each other when viewed from above, thereby defining a memory array including multiple memory cells MC. Each memory cell MC may have a transistor TR arranged therein.

For example, the transistor TR arranged in each memory cell MC may include a drain, a source, and a gate. The drain (or source) of the transistor TR may be connected to the corresponding bit line BL directly or via another transistor TR. The source (or drain) of the transistor TR may be connected to the source line (which may be the ground) directly or via another transistor TR. The gate of the transistor TR may include a floating gate (FG) surrounded by an insulator, and a control gate (CG) to which a gate voltage is applied from a word line WL.

In each of the multiple memory blocks BLK1-BLKz, a first selection line (also referred to as a source selection line or a drain selection line) may be additionally arranged outside the first outermost word line, which is closer to the read/write circuit 230 among two outermost word lines, and a second selection line (also referred to as a drain selection line or a source selection line) may be additionally arranged outside the other second outermost word line.

In some cases, at least one dummy word line may be additionally arranged between the first outermost word line and the first selection line. In addition, at least one dummy word line may be additionally arranged between the second outermost word line and the second selection line.

A read operation and a program operation (write operation) of the memory block may be performed on a page by page basis, and an erasure operation may be performed on a memory block by memory block basis.

Figure 3:
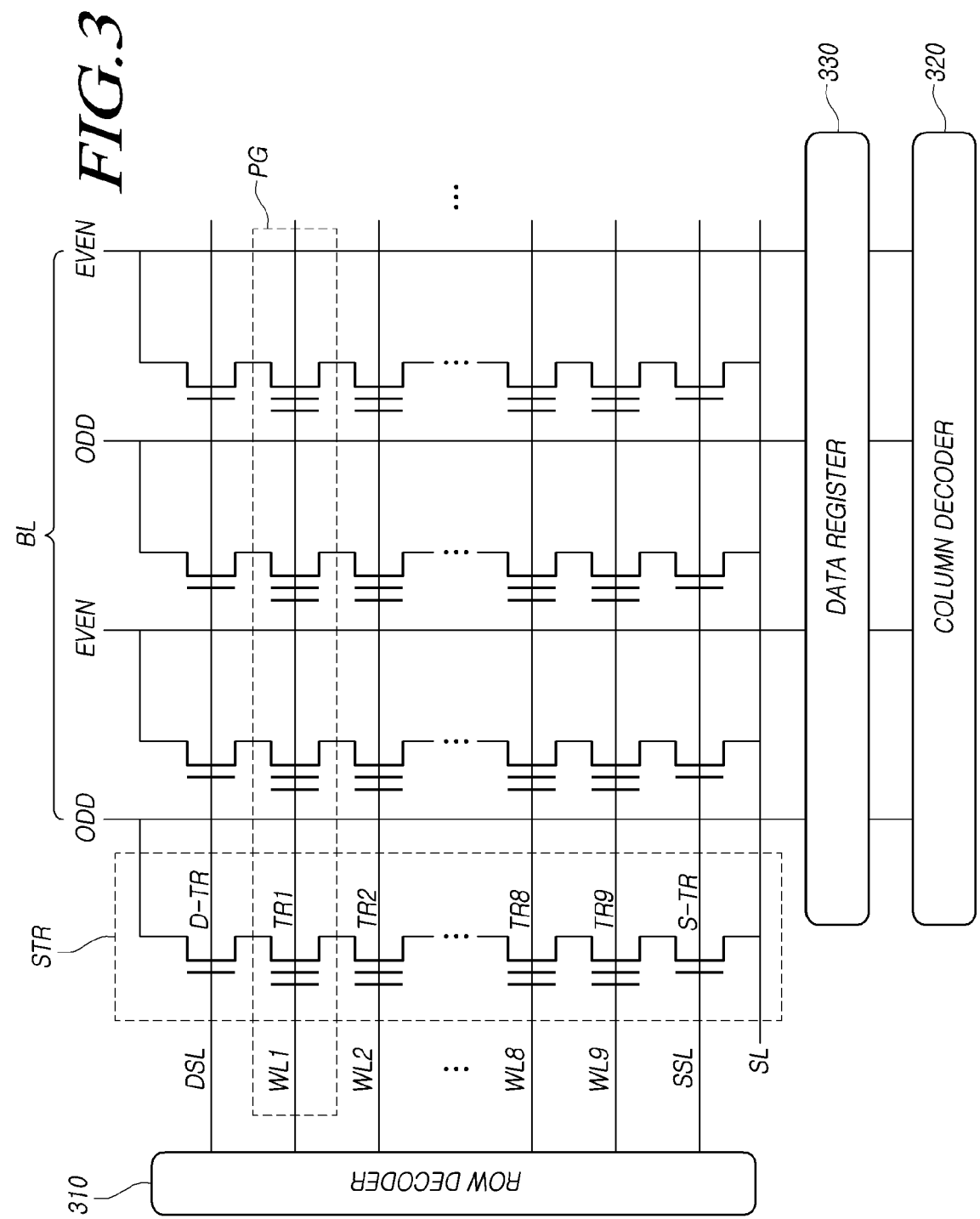
FIG. 3 is a diagram illustrating a structure of word lines and bit lines of a memory device according to an embodiment of the disclosed technology.

FIG. 3 is a diagram illustrating a structure of word lines WL and bit lines BL of a memory device 110 based on an embodiment of the disclosed technology.

Referring to FIG. 3, the memory device 110 has a core area in which memory cells MC are concentrated, and an auxiliary area which corresponds to the remaining area other than the core area. The auxiliary area includes circuitry for supporting the operations of the memory cell array 210.

The core area may include pages PG and strings STR. In some implementations, multiple word lines WL1-WL9 and multiple bit lines BL are arranged to intersect when viewed from above.

The word lines WL1-WL9 may be connected to a row decoder 310. The bit lines BL may be connected to a column decoder 320. A data register 330, which corresponds to the read/write circuit 230 of FIG. 2, may exist between the multiple bit lines BL and the column decoder 320.

The multiple word lines WL1-WL9 may correspond to multiple pages PG.

For example, each of the multiple word lines WL1-WL9 may correspond to one page PG as illustrated in FIG. 3. When each of the multiple word lines WL1-WL9 has a large size, each of the multiple word lines WL1-WL9 may correspond to at least two (e.g., two or four) pages PG. Each page PG is the smallest unit in connection with conducting a program operation and a read operation, and all memory cells MC within the same page PG may perform simultaneous operations when conducting a program operation and a read operation.

The multiple bit lines BL may be connected to the column decoder 320. In some implementations, the multiple bit lines BL may be divided into odd-numbered bit lines BL and even-numbered bit lines BL such that a pair of odd-numbered bit line BL and even-numbered bit line B are coupled in common to a column decoder 320.

The address may be used to access one or more memory cells MC in the core area. The address can be provided through the input/output end to the row decoder 310 and the column decoder 320 to select a corresponding target memory cell. In the context of this patent document, the word "target memory cell" can be used to indicate one of the memory cells MC targeted to be accessed from the memory controller or the user, and in some implementations the memory cells MC may be located at intersections between the word lines WL1-WL9 connected to the row decoder 310 and the bit lines BL connected to the column decoder 320.

In some implementations, the data register 330 plays an important role because all data processing by the memory device 110, including program and read operations, occurs via the data register 330. If data processing by the data register 330 is delayed, all of the other areas need to wait until the data register 330 finishes the data processing, degrading the overall performance of the memory device 110.

Referring to the example illustrated in FIG. 3, in one string STR, multiple transistors TR1-TR9 may be connected to multiple word lines WL1-WL9, respectively. In some implementations, the multiple transistors TR1-TR9 correspond to memory cells MC. In this example, the multiple transistors TR1-TR9 include control gates CG and floating gates FG.

The multiple word lines WL1-WL9 include two outermost word lines WL1 and WL9. A first selection line DSL may be additionally arranged outside the first outermost word line WL1, which is closer to the data register 330 and has a shorter signal path compared to the other outermost word line WL9. A second selection line SSL may be additionally arranged outside the other second outermost word line WL9.

The first selection transistor D-TR, which is controlled to turn on/off by the first selection line DSL, has a gate electrode connected to the first selection line DSL, but includes no floating gate FG. The second selection transistor S-TR, which is controlled to turn on/off by the second selection line SSL, has a gate electrode connected to the second selection line SSL, but includes no floating gate FG.

The first selection transistor D-TR is used as a switch circuit that connects the corresponding string STR to the data register 330. The second selection transistor S-TR is used as a switch circuit that connects the corresponding string STR to the source line SL. That is, the first selection transistor D-TR and the second selection transistor S-TR can be used to enable or disable the corresponding string STR.

During a program operation, the memory system 100 fills the target memory cell MC of the bit line BL which is to be programmed with electrons. Accordingly, the memory system 100 applies a predetermined turn-on voltage Vcc to the gate electrode of the first selection transistor D-TR, thereby turning on the first selection transistor D-TR, and applies a predetermined turn-off voltage (for example, 0V) to the gate electrode of the second selection transistor S-TR, thereby turning off the second selection transistor S-TR.

The memory system 100 turns on both of the first and second selection transistors D-TR and S-TR during a read operation or a verification operation. Accordingly, during a read operation or a verification operation, an electric current may flow through the corresponding string STR and drain to the source line SL, which corresponds to the ground voltage, such that the voltage level of the bit line BL can be measured. However, during a read operation, there may be a time difference in the on/off timing between the first selection transistor D-TR and the second selection transistor S-TR.

The memory system 100 may apply a predetermined voltage (e.g., +20V) to the substrate through a source line SL during an erasure operation. The memory system 100 applies a certain voltage to allow both the first selection transistor D-TR and the second selection transistor S-TR to float during an erasure operation. As a result, the applied erasure voltage can remove electrical charges from the floating gate FG of the selected memory cell.

When the memory controller performs firmware operations, an inexecutable command can be generated due to an error in the firmware, and there is a probability for the memory controller to receive such an inexecutable command. In some cases, the memory device does not respond to inform the memory controller that an inexecutable command has been generated, and thus the memory controller is unable to identify the causes of the malfunction when a memory system malfunctions due to an inexecutable command. The technology disclosed in this patent document can be implemented in various embodiments to identify that an inexecutable command has been issued for the memory device.

Referring back to FIG. 1, a memory system 100 for implementing the disclosed technology may manage map data for performing an operation of reading, writing and erasing data in a memory device 100. The memory system may include a special cache memory device as a map cache separate from the memory device for caching the map data to quickly access the map data without accessing the memory device 110. As shown in the example in FIG. 4 below, this map cache may be part of the memory controller 120. This map cache can be used to store certain data that is also stored in the memory device 110 and is known as a cache hit. When a computer processor (e.g., a CPU) needs to access such data, instead of going to the memory device 110, such data can be accessed at a high speed from the map cache. For data that is only stored in the memory device 110 but is not cached in the map cache, such data is a cache miss and can only be accessed by reading it from the memory device at a slower speed.

In this case, as the hit ratio of the data cached in the map cache is higher, the memory system can quickly access the map data, and can quickly process the operation of reading, writing and erasing data in the memory device.

Figure 4:
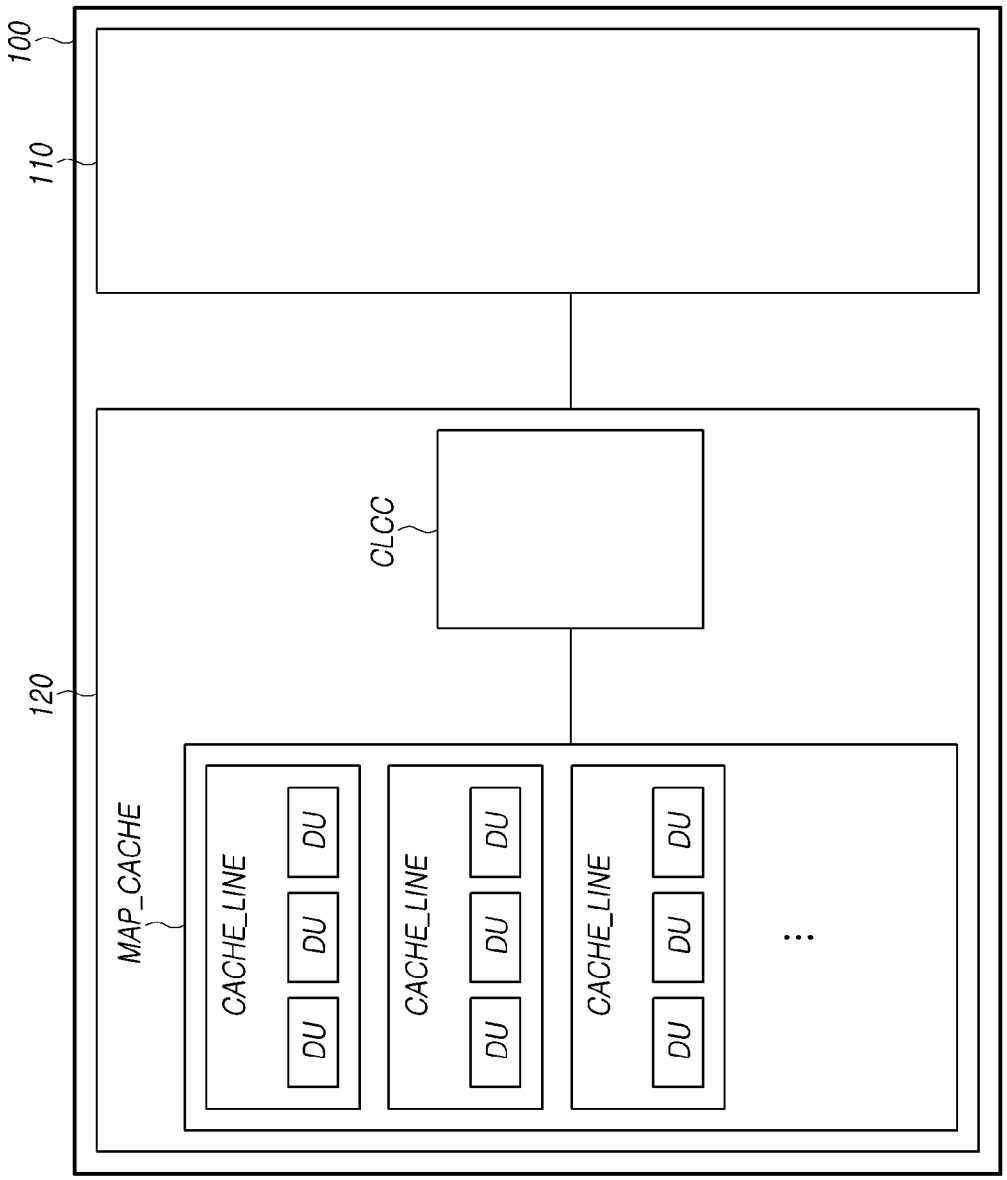
FIG. 4 is a schematic configuration diagram of the memory system according to embodiments of the disclosed technology.

FIG. 4 is a schematic configuration diagram of a memory system 100 based on some embodiments of the disclosed technology.

Referring to FIG. 4, the memory controller 120 of the memory system 100 may include the map cache MAP_CACHE and the cache line control circuit CLCC.

The map cache MAP_CACHE may include N cache lines CACHE_LINEs each used to cache map data (where N is a natural number equal to or greater than 2). The cache line CACHE_LINE refers to a basic unit of the map cache MAP_CACHE, and the map cache MAP_CACHE may cash the map data in the unit of the cache line CACHE_LINE. For example, if the size of the cache line CACHE_LINE is 64 byte, the map cache MAP_CACHE may cache map data in the unit of 64 byte, and thus map data having a size smaller than 64 byte, e.g., 32 byte, 16 byte, may not be cashed in the map cache MAP_CACHE.

If the map data is cached in the map cache MAP_CACHE, the memory controller 120 may access the map data in the map cache MAP_CACHE, and if the map data is not cached in the map cache MAP_CACHE, the memory controller 120 may read the map data from the memory device 110 and then cache the map data in the map cache MAP_CACHE. The map cache MAP_CACHE may be located in the working memory 125 of the memory controller 120.

The map cache MAP_CACHE may cache various types of map data. For example, the types of map data that can be cached in the map cache MAP_CACHE are as follows.

1. L2V Data Type

Map data having the L2V data type may indicate a mapping relationship between the logical address (LA) transmitted from the host and the virtual physical address (VA) of the memory device 100. In this case, the virtual physical address may correspond to the physical address of the virtual flash memory, which may correspond to the physical address of the memory device 110 by the virtual flash layer.

2. VPT Data Type

Map data having the VPT data type may indicate whether a page located at an address indicated by the map data is a valid page.

3. Journaling Data Type

Map data having the journaling data type may indicate changes in map data and be used to track a change history of map data.

4. Other Data Types

Map data having other data types than the L2V data, VPT data, and journaling data may indicate information (e.g. read count and erase count for each memory block).

The cache line control circuit CLCC may control N flag sets corresponding to the N cache lines CACHE_LINE included in the map cache MAP_CACHE.

When a cache line CACHE_LINE includes M data units (where M is a natural number equal to or greater than 2), the flag set corresponding to each cache line may include M flags indicating whether or not the cache hits have been made for each of the M data units. When the memory controller 120 receives an instruction or data access request, the map cache MAP_CACHE is checked to see if the requested item is in the map cache MAP_CACHE. If it is, it is called a cache "hit" and the item is retrieved from the map cache MAP_CACHE. The flag may indicate two states including a set state or a reset state. The set state may have a first value (e.g., 1) and the reset state may have a second value (e.g., 0). The configuration of the cache line and flag set will be described in detail below with reference to FIG. 5.

The flag set corresponding to the cache line CACHE_LINE may be located in the map cache MAP_CACHE together with the corresponding cache line, or may be located in the cache line control circuit CLCC separately from the corresponding cache line, or may be located in a separate volatile memory located outside the map cache MAP_CACHE and the cache line control circuit CLCC.

In some implementations, the cache line control circuit CLCC may be a separate logic circuit located outside the processor 124 of the memory controller 120. The cache line control circuit CLCC may be implemented with a combination of microprocessor, CPU, FPGA, ASIC and other programmable logic elements.

Figure 5:
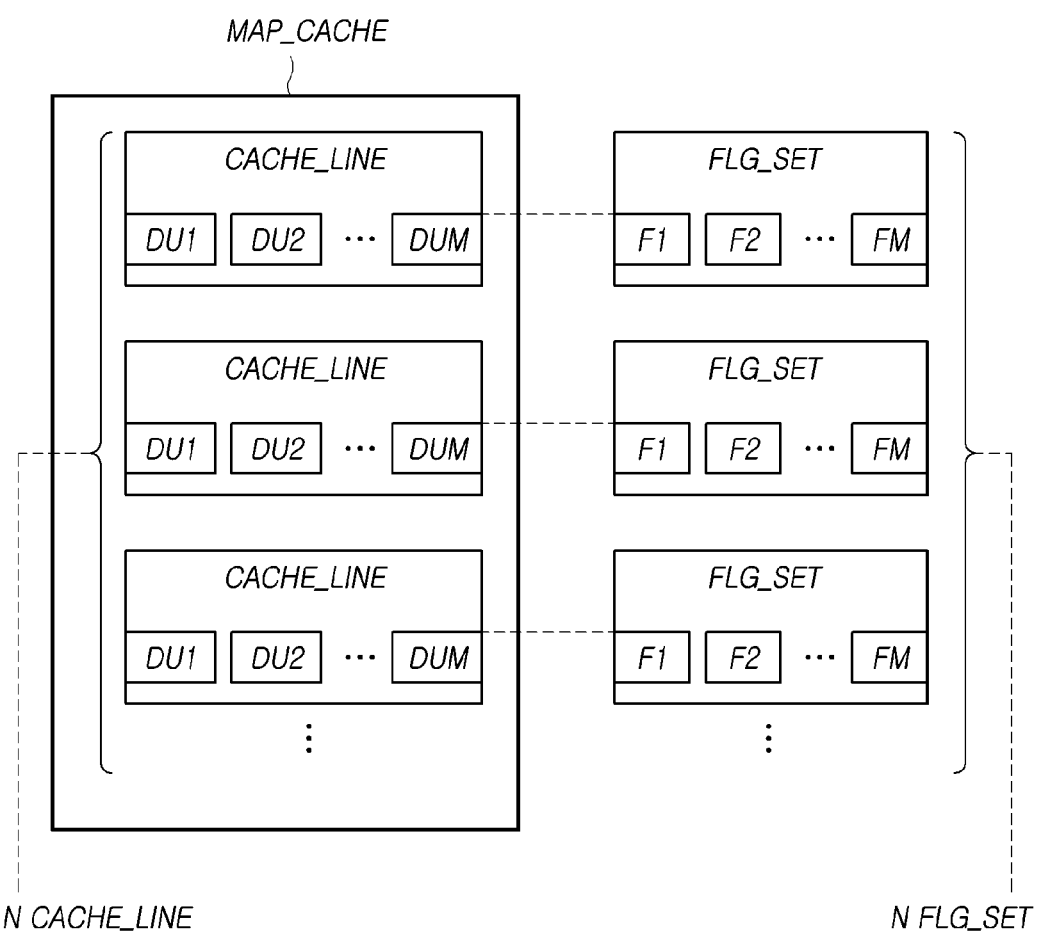
FIG. 5 is a configuration diagram of a map cache according to embodiments of the disclosed technology.

FIG. 5 is a configuration diagram of the map cache MAP_CACHE according to embodiments of the disclosed technology.

Referring to FIG. 5, each of the N cache lines CACHE_LINE included in the map cache MAP_CACHE may include M data units DU1 to DUM. For example, one cache line may include 8 data units having a size of 4 byte, and the total size of the cache line may be 4 byte*8=32 byte.

In addition, as described above with reference to FIG. 4, there may be N flag sets FLG_SETs corresponding to the N cache lines CACHE_LINE.

Each flag set may include M flags F1 to FM indicating whether or not the cache hits have been made for the M data units DU1 to DUM that are included in the corresponding cache line.

A flag may be set when the cache hit was occurred for the data unit and the memory controller 120 accesses the data unit.

For example, when a data unit DU1 among M data units DU1 to DUM included in the cache line is hit, the flag F1 corresponding to the data unit DU1 may be set.

As another example, when the data unit DU2 among M data units DU1, DU2, . . . , DUM included in the cache line is hit, the flag F2 corresponding to the data unit DU2 may be set.

Each flag may be reset when the data unit corresponding to the flag is read or evicted from the map cache MAP_CACHE.

The flag set FLG_SET described above may be implemented using various data structures. For example, the flag set FLG_SET may be implemented as a bitmap. In this case, each bit included in the bitmap may correspond to one flag. In another example, the flag set FLG_SET may be implemented as a table. In this case, each table entry included in the table may correspond to one flag.

In the above, the cache line CACHE_LINE included in the map cache MAP_CACHE and the flag set FLG_SET corresponding to each cache line have been described.

Hereinafter, there will be described the operation in which the cache line control circuit CLCC determine the target map data TGT_MAP_DATA to be cached in the map cache MAP_CACHE based on a flag set FLG_SET for one of the N cache lines CACHE_LINE included in the map cache MAP_CACHE.

Figure 6:
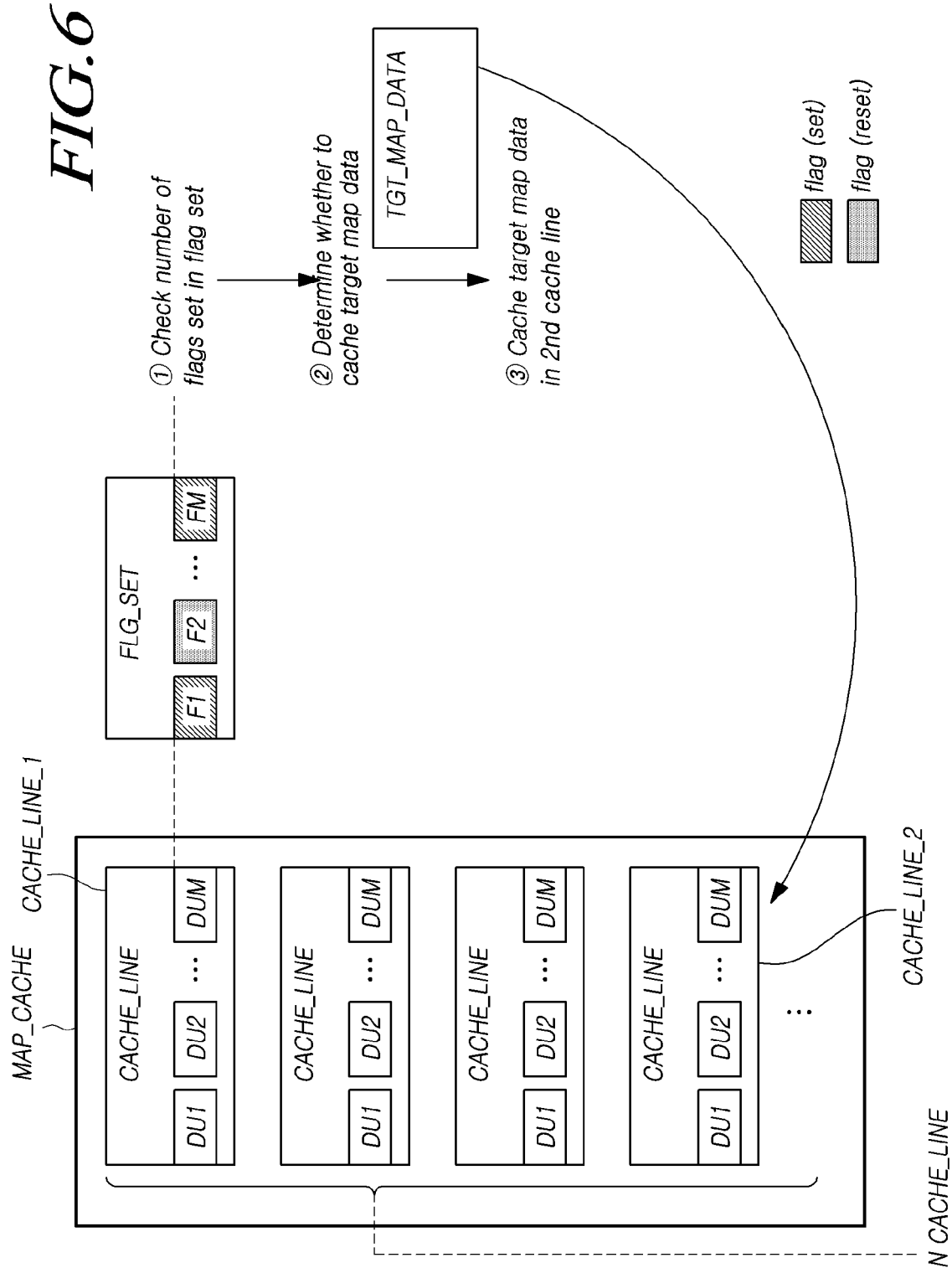
FIG. 6 is a diagram illustrating the operation of caching target map data in the map cache according to embodiments of the disclosed technology.

FIG. 6 is a diagram illustrating the operation of caching target map data TGT_MAP_DATA in the map cache MAP_CACHE according to embodiments of the disclosed technology.

Referring to FIG. 6, the cache line control circuit CLCC may check the number of flags set in the flag set FLG_SET corresponding to the first cache line CACHE_LINE_1 among the N cache lines CACHE_LINE included in the map cache MAP_CACHE (①). For example, in the case that the number of flags included in the flag set FLG_SET corresponding to the first cache line CACHE_LINE_1 is 8, the cache line control circuit CLCC may confirm that the set flags are 4.

In addition, the cache line control circuit CLCC may determine whether to cache the target map data TGT_MAP_DATA (②) based on the number of flags set in the flag set FLG_SET corresponding to the first cache line CACHE_LINE_1. The target map data TGT_MAP_DATA may be cached in the map cache MAP_CACHE from the memory device 110.

The target map data TGT_MAP_DATA is map data determined to be highly likely to be accessed by the memory controller 120 by the cache line control circuit CLCC. The cache line control circuit CLCC may select target map data TGT_MAP_DATA from among map data stored in the memory device 110.

To cache the target map data TGT_MAP_DATA, the cache line control circuit CLCC may read the target map data TGT_MAP_DATA from the memory device 110 and cache the target map data TGT_MAP_DATA in the second cache line CACHE_LINE_2 among the N cache lines CACHE_LINE included in the map cache MAP_CACHE (③). In this case, the second cache line CACHE_LINE_2 is a cache line different from the first cache line CACHE_LINE_1.

Based on the above, the cache line control circuit CLCC may check the state of the flag set FLG_SET corresponding to the first cache line CACHE_LINE_1, and cache target map data TGT_MAP_DATA, which is likely to be accessed by the memory controller 120, in the map cache MAP_CACHE in advance before the access by the memory controller 120.

Accordingly, when the memory controller 120 accesses the target map data TGT_MAP_DATA, the cache hit occurs in the map cache MAP_CACHE. Therefore, the memory controller 120 can access the target map data TGT_MAP_DATA in the second cache line CACHE_LINE_2 included in the map cache MAP_CACHE without having to search the target map data TGT_MAP_DATA from the memory device 110. This can increase the hit ratio of the map cache MAP_CACHE.

Hereinafter, an example of the operation in which the cache line control circuit CLCC determines whether to cache the target map data TGT_MAP_DATA in the map cache MAP_CACHE based on the number of flags set in the flag set FLG_SET for the first cache line CACHE_LINE_1 will be explained with reference to FIG. 7.

Figure 7:
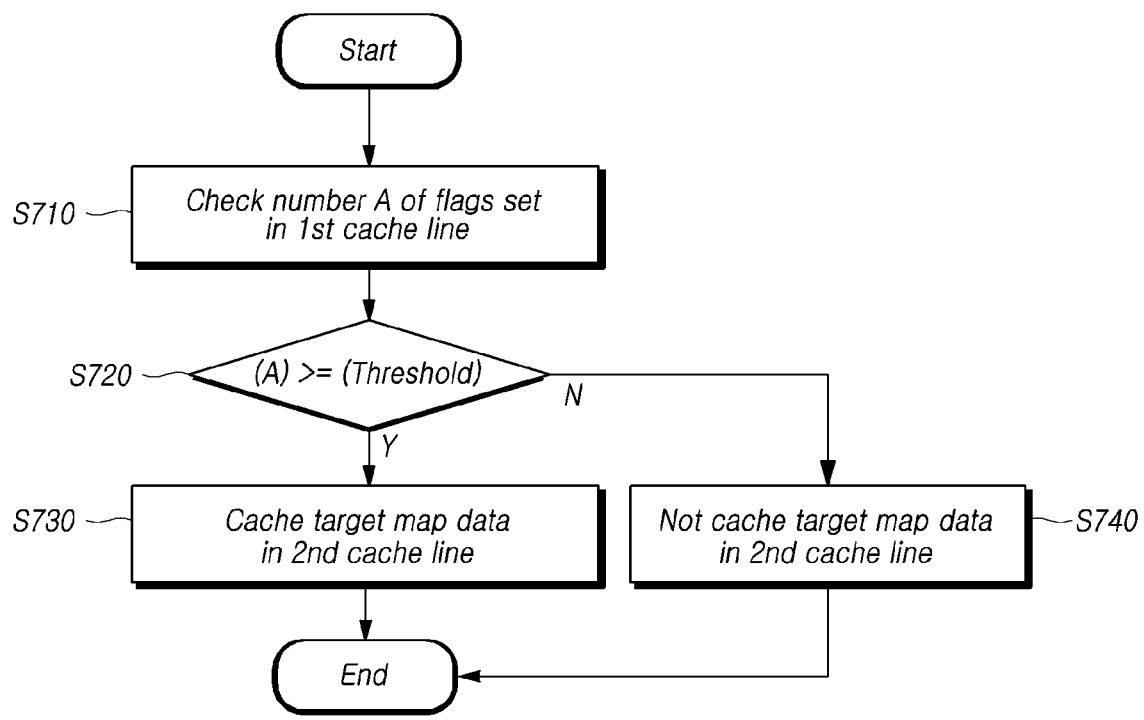
FIG. 7 is a flowchart illustrating an example of the operation of determining whether to cache target map data in the map cache according to embodiments of the disclosed technology.

FIG. 7 is a flowchart illustrating an example of the operation of determining whether to cache target map data TGT_MAP_DATA in the map cache MAP_CACHE based on embodiments of the disclosed technology.

Referring to FIG. 7, the cache line control circuit CLCC may check the number A of flags set in the flag set corresponding to the first cache line CACHE_LINE_1 (S710).

The cache line control circuit CLCC may determine whether the value of A checked in step S710 is equal to or greater than a threshold (S720).

In the case that the value of A is greater than or equal to the threshold (S720-Y), the cache line control circuit CLCC may cache the target map data TGT_MAP_DATA in the second cache line CACHE_LINE_2 (S730). If the value of A is less than the threshold (S720-N), the cache line control circuit CLCC may not cache the target map data TGT_MAP_DATA in the second cache line CACHE_LINE_2 (S740).

For example, if the threshold is 5, the cache line control circuit CLCC may cache the target map data TGT_MAP_DATA in the second cache line CACHE_LINE_2 when the number of flags set in the flag set corresponding to the first cache line CACHE_LINE_1 is equal to or greater than 5.

Although, in FIG. 7, the number (A) of flags set in the flag set corresponding to the first cache line CACHE_LINE_1 is compared with the threshold, it is also possible to use a set flag ratio instead of the number (A) of flags set in the flag set corresponding to the first cache line CACHE_LINE_1. For example, the set flag ratio can be obtained by dividing the value of A by the number of all flags included in the flag set.

To determine whether to cache the target map data TGT_MAP_DATA, the set flag ratio can be compared with a threshold ratio value.

The reason for determining whether to cache the target map data TGT_MAP_DATA in the map cache MAP_CACHE based on the number of flags set in the flag set FLG_SET is as follows.

In general, when the host sequentially reads or writes user data to the memory system 100, the memory controller 120 has a high probability of accessing subsequent map data for the map data cached in the corresponding cache line after M data units included in one cache line cached in the map cache MAP_CACHE are sequentially hit. In this case, since the subsequent map data has not yet been accessed by the memory controller 120, a cache miss may occur.

In addition, even when the host randomly writes user data to the memory system 100, VPT data among the map data can be sequentially accessed. In this case, after the M data units included in one cache line in which the VPT data is cached in the map cache MAP_CACHE are sequentially hit, it is highly likely that subsequent map data for the map data cached in the corresponding cache line will be accessed.

Accordingly, the cache line control circuit CLCC may check the number of flags set in the flag set corresponding to the corresponding cache line, and if the number of flags set is greater than or equal to the threshold, it may be determined that there is a high possibility that the subsequent map data following the map data cached in the corresponding cache line will be soon accessed by the memory controller 120. Accordingly, the cache line control circuit CLCC may cache the subsequent map data in the map cache MAP_CACHE in advance so that a cache hit occurs when the subsequent map data is accessed. Therefore, the cache line control circuit CLCC can increase the hit ratio of the map cache MAP_CACHE and quickly process the request (e.g. read request/write request) received from the host.

Hereinafter, the position of the subsequent map data will be described.

Figure 8:
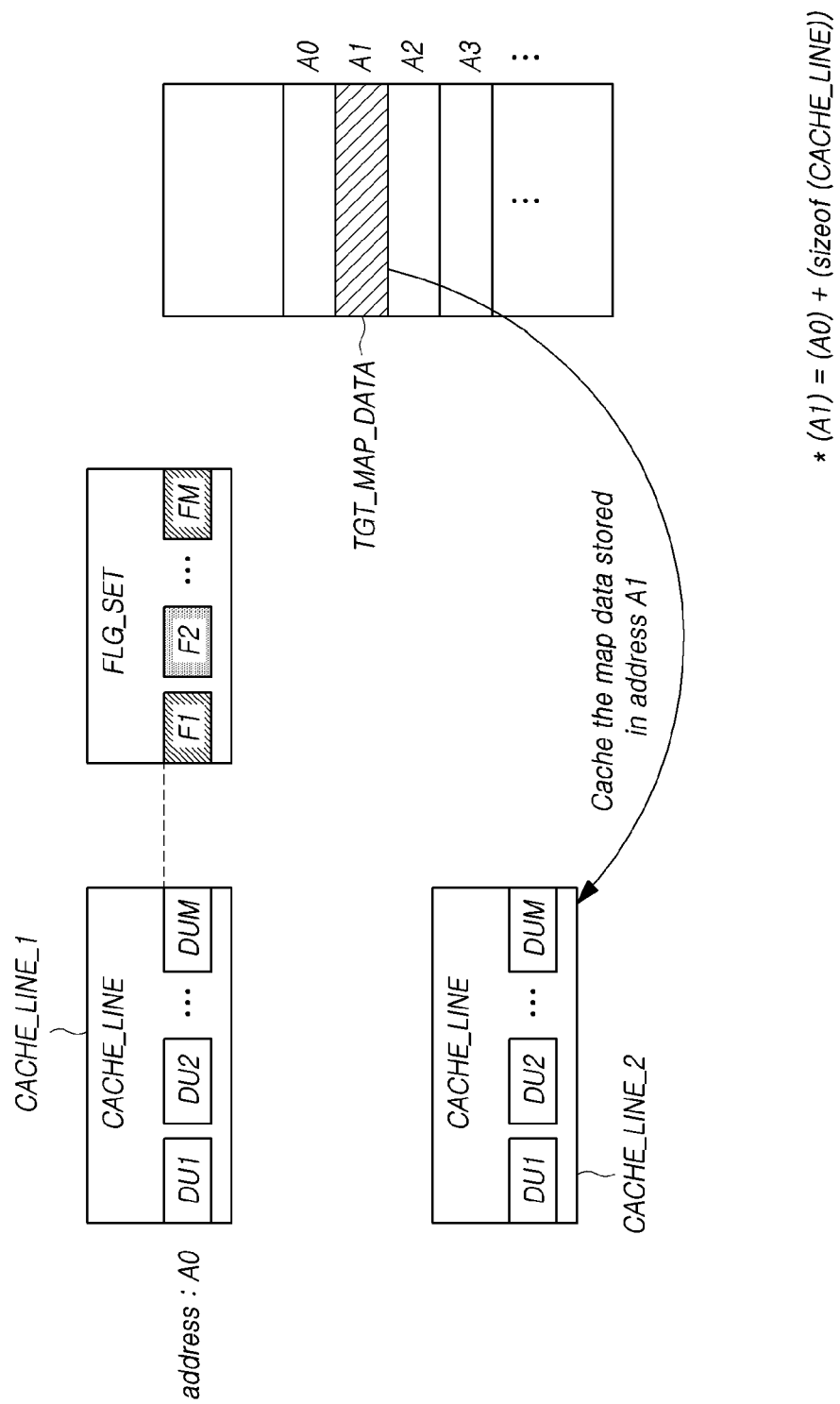
FIG. 8 is a diagram illustrating an example of an address value of target map data according to embodiments of the disclosed technology.

FIG. 8 is a diagram illustrating an example of an address value of target map data TGT_MAP_DATA according to embodiments of the disclosed technology.

In FIG. 8, it is assumed that map data cached in the first cache line CACHE_LINE_1 has an address value of A0 is. Map data cached in the first cache line CACHE_LINE_1 may be stored in data units DU1 to DUM.

In this case, when the number of flags set in the flag set FLG_SET for the first cache line CACHE_LINE_1 is greater than or equal to the threshold, the map data stored in the address A1 that is subsequent to the address A0 may be determined as target map data TGT_MAP_DATA to be cached in the second cache line CACHE_LINE_2. In this case, the map data cached in the first cache line CACHE_LINE_1 may be map data stored adjacent to the target map data TGT_MAP_DATA in the memory device 110.

The address A1 and the address A0 may be consecutive to each other.

As an example, the value of A1 may be determined based on the size of the cache line CACHE_LINE. The value of A1 may be a value obtained by adding the size of the cache line CACHE_LINE to A0.

For example, assume that the value of A0 is 0x1000 and the size of the cache line CACHE_LINE is 0x40. In this case, the value of A1 may be 0x1000+0x40=0x1040. When map data of 0x40 bytes starting at address 0x1000 is cached in the first cache line CACHE_LINE_1, the cache line control circuit CLCC may cache the target map data TGT_MAP_DATA adjacent to the map data cached in the first cache line CACHE_LINE_1 in the second cache line CACHE_LINE_2.

Figure 9:
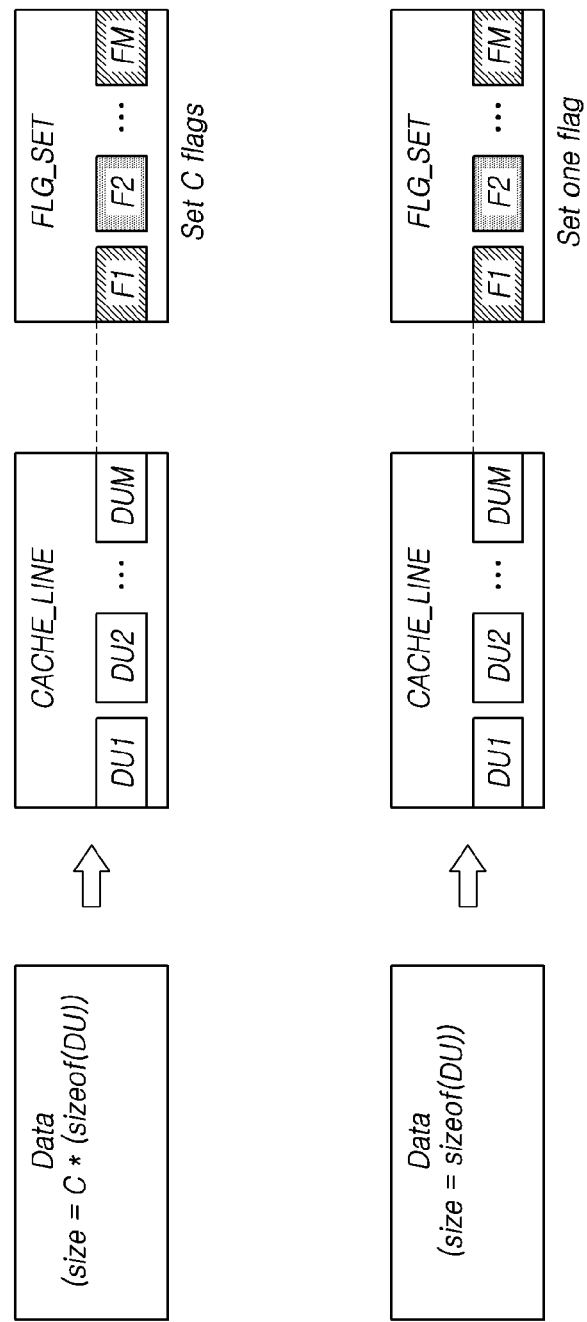
FIG. 9 is a diagram illustrating the number of flags that can be simultaneously set in the flag set for the cache line according to embodiments of the disclosed technology.

FIG. 9 is a diagram illustrating the number of flags that can be simultaneously set in the flag set FLG_SET for the cache line CACHE_LINE based on some embodiments of the disclosed technology.

Referring to FIG. 9, the cache line control circuit CLCC may determine the number of flags that are simultaneously set in the flag set based on a data access unit for the map cache MAP_CACHE. The data access unit for the map cache MAP_CACHE may be determined based on the size of map data that the memory controller 120 can access from the map cache MAP_CACHE at one time.

Assume that the data access unit for the map cache MAP_CACHE is C times the size of the data unit DU included in the cache line CACHE_LINE (C is a natural number of 2 or more). In this case, the cache line control circuit CLCC may simultaneously set C flags in the flag set FLG_SET. For example, if the data unit DU is 4 byte and C is 8, the cache line control circuit CLCC may simultaneously set eight flags in the flag set FLG_SET.

In another example, assuming that the data access unit for the map cache MAP_CACHE is the same as the data unit DU included in the cache line CACHE_LINE, the cache line control circuit CLCC may set 1 flag in the flag set FLG_SET.

In the above, the operation of the cache line control circuit CLCC to cache the target map data TGT_MAP_DATA in the map cache MAP_CACHE has been described.

But the operation of the cache line control circuit CLCC to cache the target map data TGT_MAP_DATA in the map cache MAP_CACHE may be skipped when the target map data TGT_MAP_DATA is already cached in the map cache MAP_CACHE.

Figure 10:
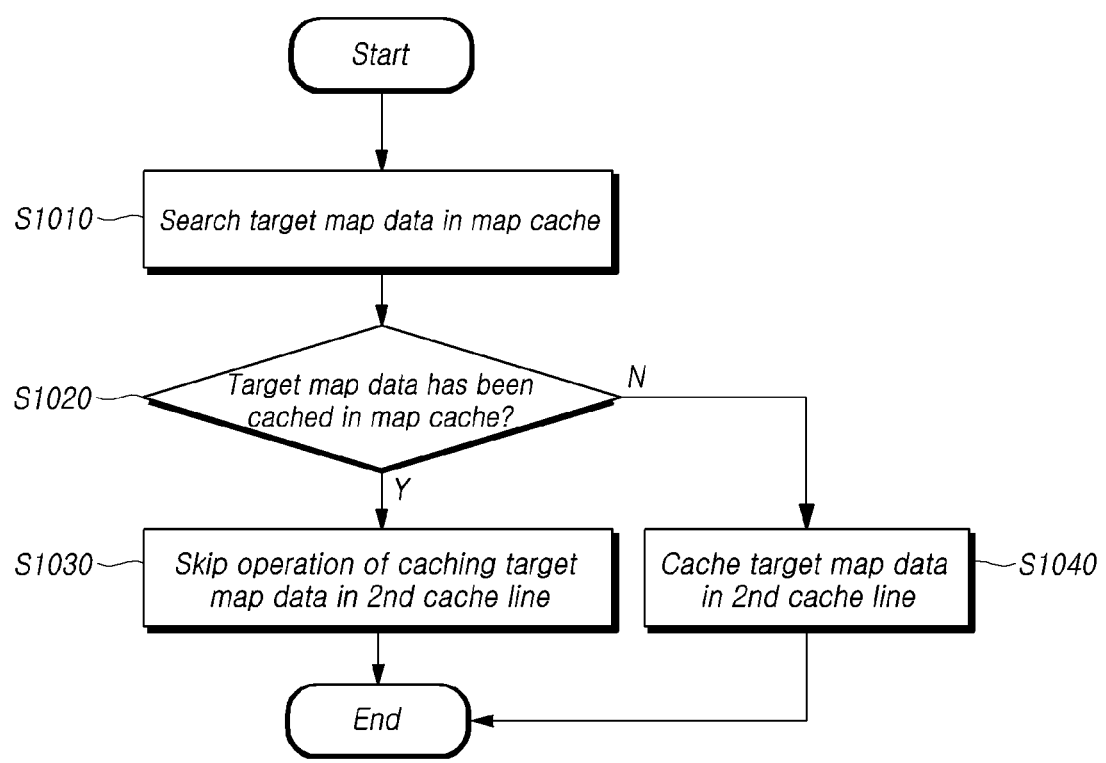
FIG. 10 is a flowchart illustrating an operation of determining whether to skip the operation of caching target map data in the map cache by the cache line control circuit according to embodiments of the disclosed technology.

FIG. 10 is a flowchart illustrating an operation of determining whether to skip the operation of caching target map data TGT_MAP_DATA in the map cache MAP_CACHE by the cache line control circuit CLCC according to embodiments of the disclosed technology.

Referring to FIG. 10, the cache line control circuit CLCC may search the target map data TGT_MAP_DATA to be cached in the map cache MAP_CACHE in the map cache MAP_CACHE (S1010).

The cache line control circuit CLCC may determine whether the target map data TGT_MAP_DATA has been previously cached in the map cache MAP_CACHE (S1020). When the host randomly reads or writes user data to the memory system 100, there is a possibility that the target map data TGT_MAP_DATA is already cached in the map cache MAP_CACHE.

In the case that the target map data TGT_MAP_DATA has been cached in advance in the map cache MAP_CACHE (S1020-Y), the cache line control circuit CLCC may skip the operation of caching the target map data TGT_MAP_DATA in the second cache line CACHE_LINE_2 (S1030). This is because it is not necessary to cache the target map data TGT_MAP_DATA in duplicate in the map cache MAP_CACHE.

Meanwhile, in the case that the target map data TGT_MAP_DATA is in the state not being cached in the map cache MAP_CACHE (S1020-N), the cache line control circuit CLCC may cache the target map data TGT_MAP_DATA in the second cache line CACHE_LINE_2 (S1040).

In the above, the operation in which the cache line control circuit CLCC controls the flag set for one cache line has been described.

Hereinafter, there will be described the operation in which the cache line control circuit CLCC controls one or more flag sets in parallel.

Figure 11:
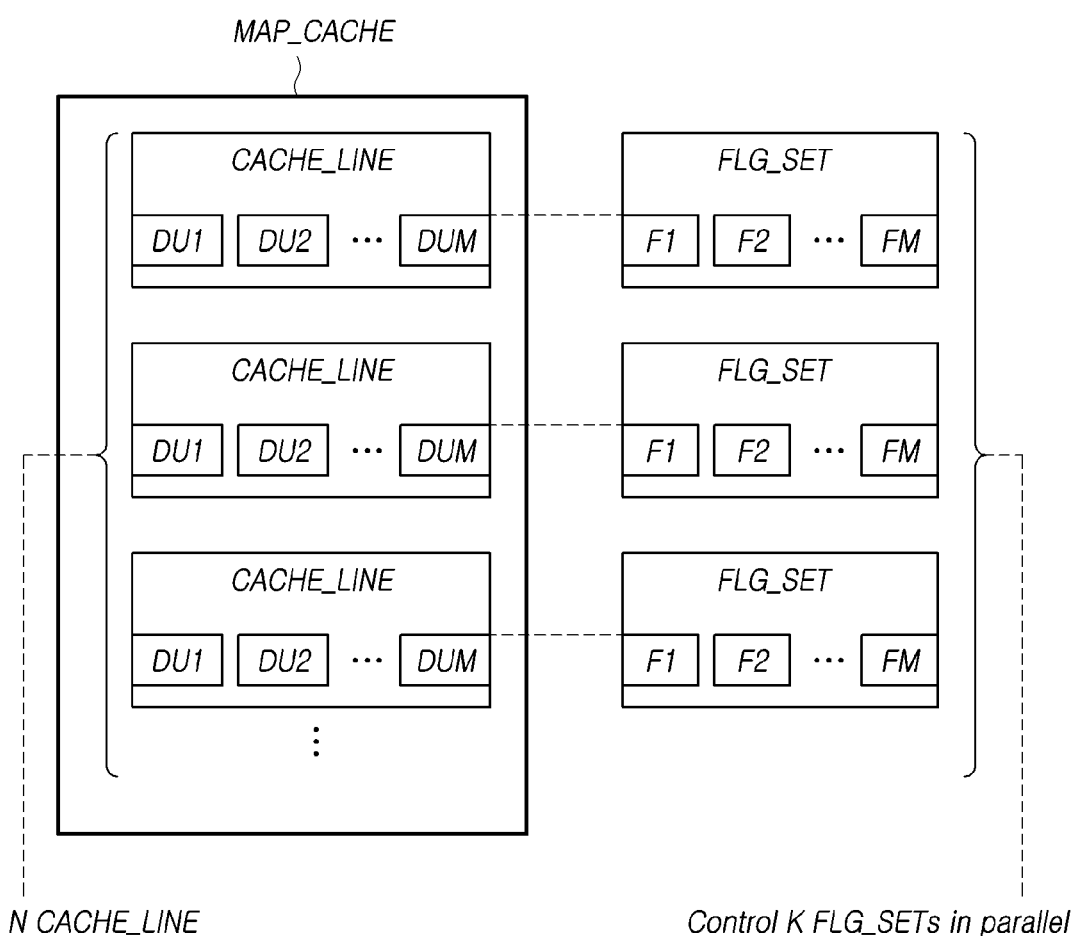
FIG. 11 is a diagram illustrating K flag sets controlled in parallel by the cache line control circuit according to embodiments of the disclosed technology.

FIG. 11 is a diagram illustrating K flag sets controlled in parallel by the cache line control circuit CLCC according to embodiments of the disclosed technology.

Referring to FIG. 11, the cache line control circuit CLCC may control flag sets FLG_SET for a maximum of K cache lines (where K is a natural number less than N) among N cache lines CACHE_LINE included in the map cache MAP_CACHE in parallel. In this case, the feature that the cache line control circuit CLCC controls the flag sets FLG_SET for K cache lines in parallel may mean that the cache line control circuit CLCC may process an arbitrary flag set among the flag sets FLG_SET for K cache lines instead of sequentially processing the flag set for each cache line.

The cache line control circuit CLCC may simultaneously control the flag sets FLG_SET for each of the K cache lines. For example, when the memory controller 120 simultaneously accesses a plurality of cache lines among N cache lines CACHE_LINE through different processes or threads, the cache line control circuit CLCC may control a plurality of flag sets corresponding to each of the plurality of cache lines being accessed.

In this case, the cache line control circuit CLCC can quickly cache map data being required to be cached in advance in the map cache MAP_CACHE by controlling the plurality of flag sets in parallel instead of sequentially controlling.

Figure 12:
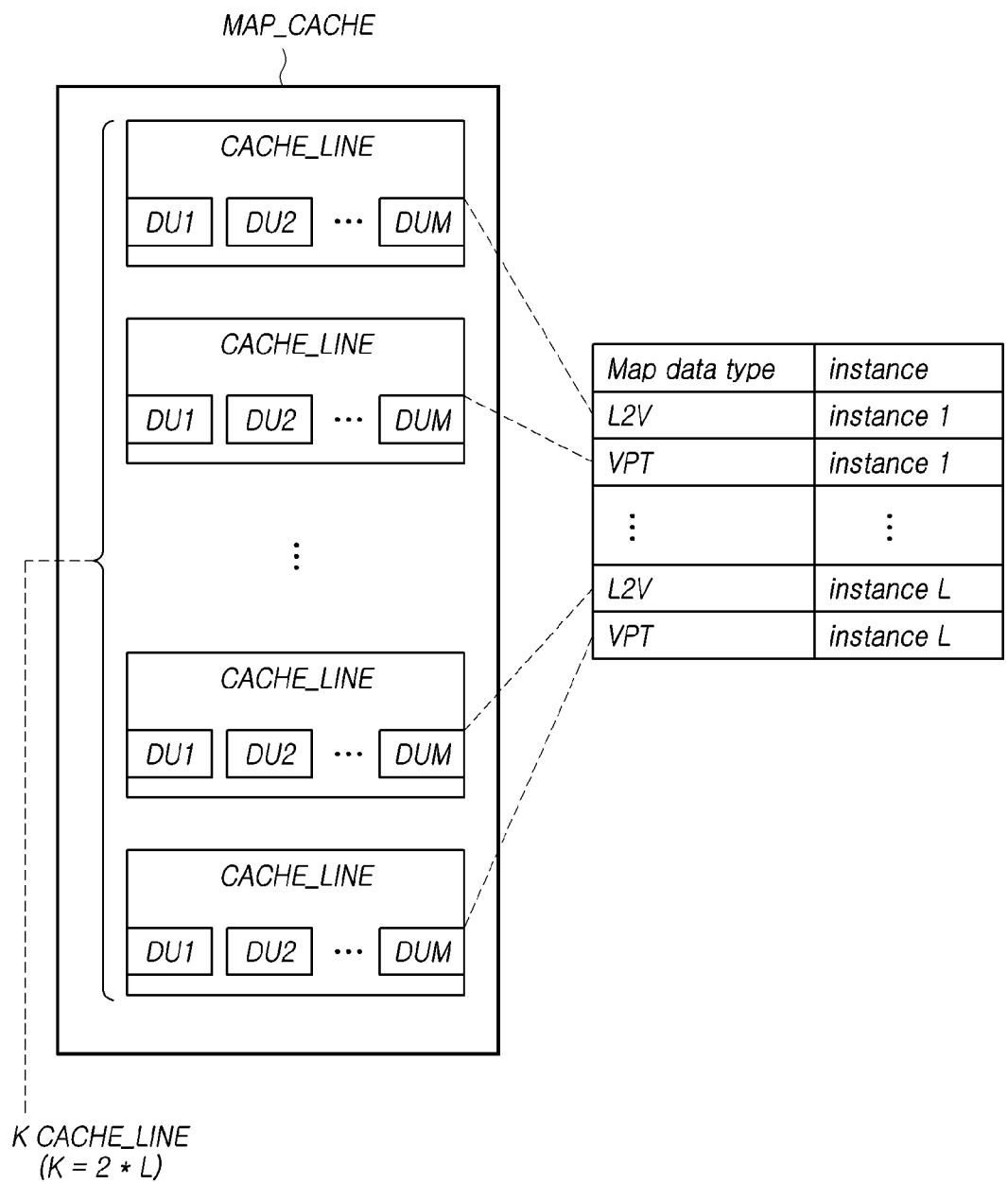
FIG. 12 is a diagram illustrating an example of determining the K value of FIG. 11.

FIG. 12 is a diagram illustrating an example of determining the K value of FIG. 11.

Referring to FIG. 12, the K value may be determined according to the number of types of map data capable of being cached in the N cache lines CACHE_LINE included in the map cache MAP_CACHE and the number of instances accessible to the N cache lines CACHE_LINE.

In this case, the type of the map data may be an L2V data type or a VPT data type, for example.

The instance may be a unit for performing the operation of accessing map data cached in the map cache MAP_CACHE, and may be a thread or a process. FTL can manage more than one instance.

In FIG. 12, it is assumed that there are two types of map data (L2V data type or VPT data type) that can be cached in N cache lines CACHE_LINE. In addition, it is assumed that the number of instances accessible to N cache lines CACHE_LINE is L.

In this case, the K value may be (2*L), which is a product of 2 types of map data and L number of instances. This mean that up to (2*L) cache lines can be accessed at the same time when all instances accessible to N cache lines CACHE_LINE have access streams accessing two different types of map data.

Meanwhile, in order to cache flag sets for K cache lines in parallel, the cache line control circuit CLCC may include a flag set cache for caching flag sets for K cache lines. Hereinafter, this will be described in detail in FIG. 13.

Figure 13:
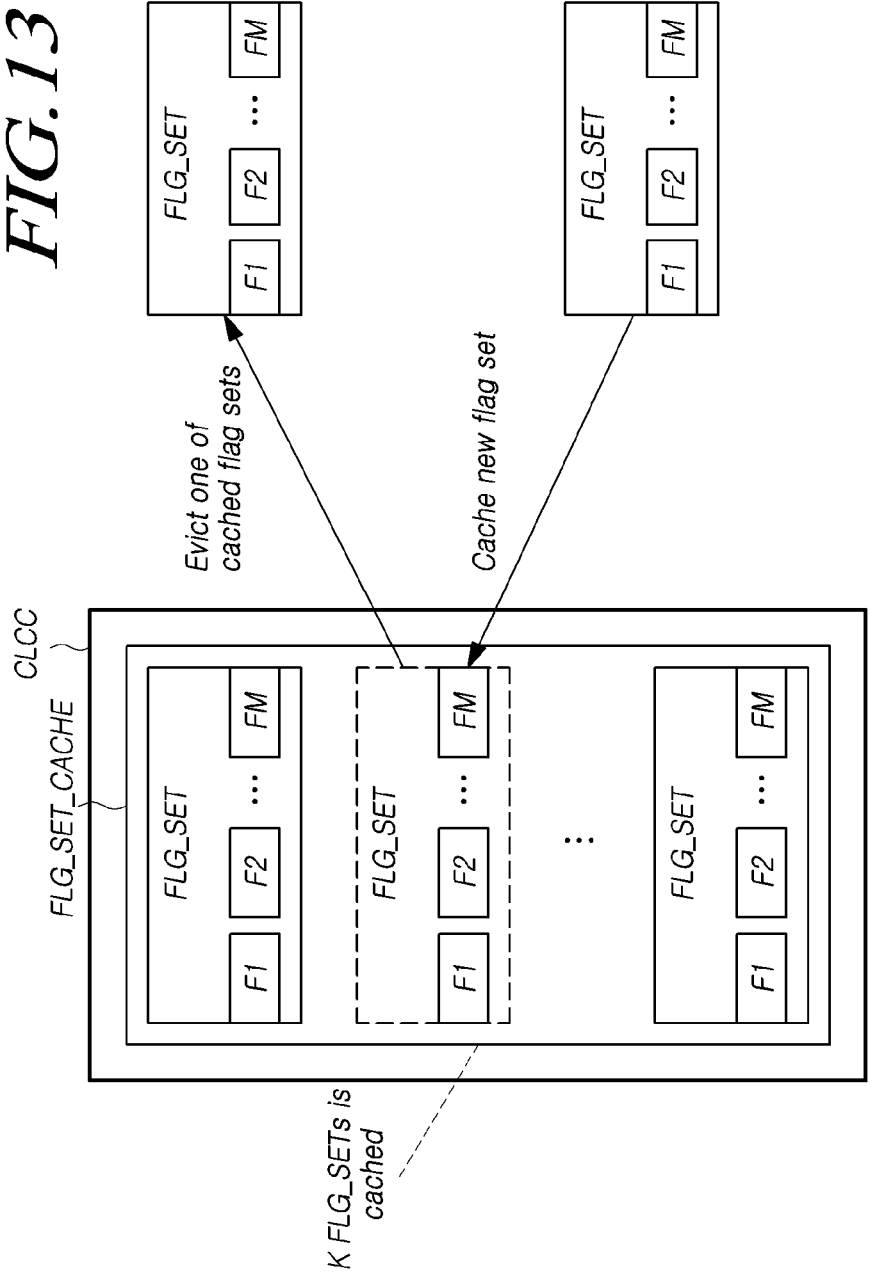
FIG. 13 is a diagram illustrating an example of the cache line control circuit according to embodiments of the disclosed technology.

FIG. 13 is a diagram illustrating an example of the cache line control circuit CLCC according to embodiments of the disclosed technology.

In FIG. 13, the cache line control circuit CLCC may cache the flag sets for K cache lines to be controlled in parallel among the N cache lines CACHE_LINE in the flag set cache FLG_SET_CACHE.

Meanwhile, when the cache line control circuit CLCC accesses any one of the flag sets not cached in the flag set cache FLG_SET_CACHE among the flag sets for the N cache lines CACHE_LINE, the cache line control circuit CLCC may cache the corresponding flag set in the flag set cache FLG_SET_CACHE. In this case, in order to secure a space for caching the corresponding flag sets in the flag set cache FLG_SET_CACHE, the cache line control circuit CLCC may evict any one of the K flag sets already cached in the flag set cache FLG_SET_CACHE from the flag set cache FLG_SET_CACHE. In this case, the policy for eviction of any one of K flag sets already cached in the flag set cache FLG_SET_CACHE may be, for example, least recently used (LRU), least frequently used (LFU), or first in first out (FIFO).

Figure 14:
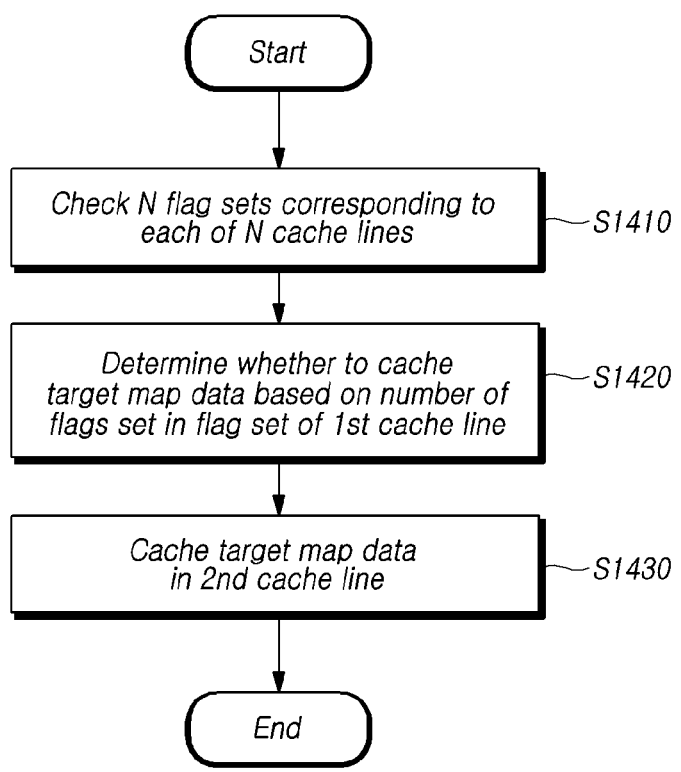
FIG. 14 is a diagram illustrating a method of operating the memory system according to embodiments of the disclosed technology.

FIG. 14 is a diagram illustrating a method of operating the memory system 100 according to embodiments of the disclosed technology.

Referring to FIG. 14, the operating method of the memory system 100 may include the step of confirming N (N is a natural number of 2 or more) flag sets FLG_SET corresponding to each of the N cache lines CACHE_LINE capable of caching map data. Each flag set may include M flags indicating whether a cache hit for each of M (M is a natural number of 2 or more) data units included in the corresponding cache line (S1410).

In addition, the operation method of the memory system 100 may include the step of determining target map data TGT_MAP_DATA based on the number of flags set in the flag set corresponding to the first cache line CACHE_LINE_1 among the N cache lines CACHE_LINE (S1420).

In addition, the operating method of the memory system 100 may include the step of reading target map data TGT_MAP_DATA from the memory device 110 and caching it in a second cache line CACHE_LINE_2 among N cache lines CACHE_LINE (S1430).

In step S1430, when the number of flags set in the flag set corresponding to the first cache line CACHE_LINE_1 is equal to or greater than the threshold, the memory system 100 may cache the target map data TGT_MAP_DATA to the second cache line CACHE_LINE_2. In this case, the address value of the target map data TGT_MAP_DATA may be the subsequent address value of the address of the map data cached in the first cache line CACHE_LINE_1.

Meanwhile, in step S1410, the memory system 100 may check flag sets for a maximum of K cache lines (K is a natural number less than N) among N cache lines CACHE_LINE in parallel. In this case, the K value may be determined based on the number of types of map data capable of being cached in the N cache lines and the number of instances accessible to the N cache lines.

The operation of the memory controller 120 described above may be controlled by the control circuit 123, and may be performed in such a manner that the processor 124 executes or drives the firmware in which all operations of the memory controller 120 are programmed.

Figure 15:
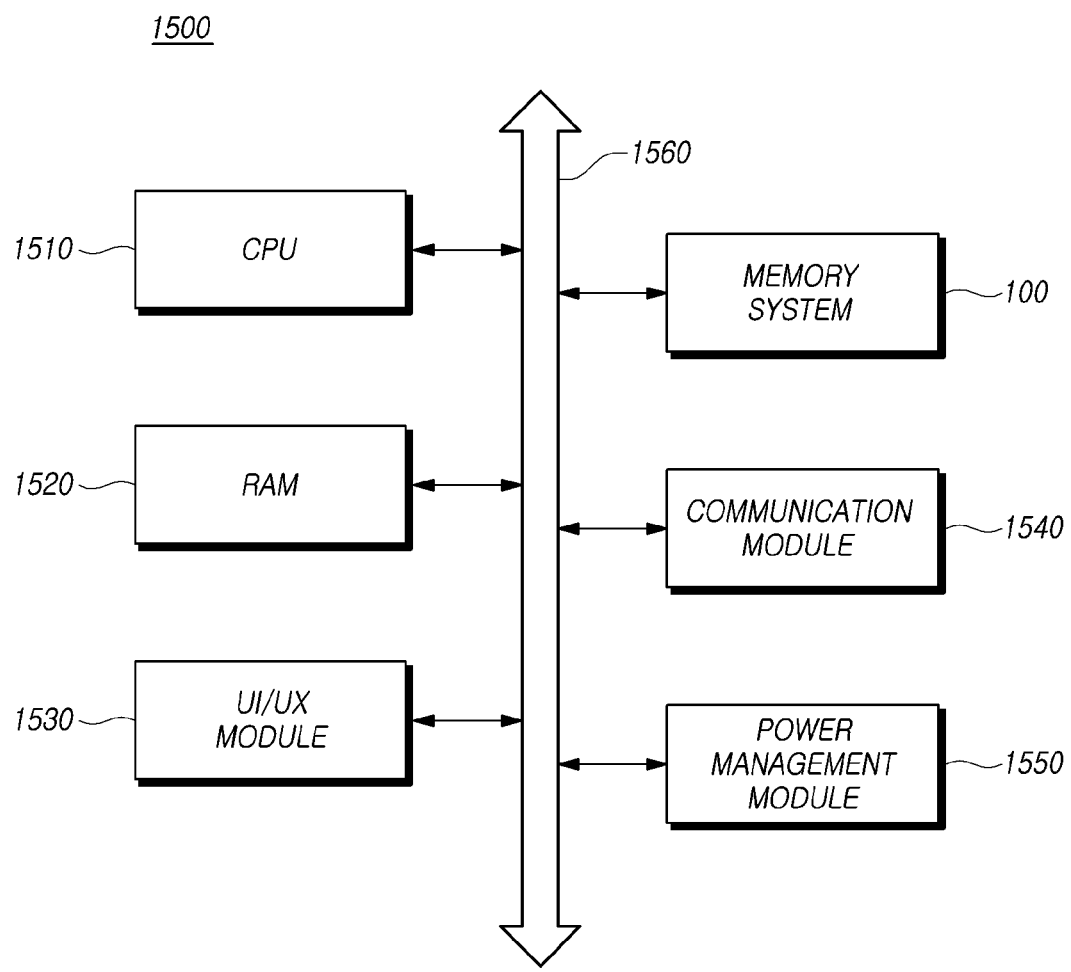
FIG. 15 is a diagram illustrating the configuration of a computing system based on embodiments of the disclosed technology.

FIG. 15 is a diagram illustrating the configuration of a computing system 1500 according to embodiments of the disclosed technology.

Referring to FIG. 15, the computing system 1500 according to an embodiment of the disclosed technology may include: a memory system 100 electrically connected to a system bus 1560; a CPU 1510 configured to control the overall operation of the computing system 1500; a RAM 1520 configured to store data and information related to operations of the computing system 1500; a user interface/user experience (UI/UX) module 1530 configured to provide the user with a user environment; a communication module 1540 configured to communicate with an external device as a wired and/or wireless type; and a power management module 1550 configured to manage power used by the computing system 1500.

The computing system 1500 may be a personal computer (PC) or may include a mobile terminal such as a smartphone, a tablet or various electronic devices.

The computing system 1500 may further include a battery for supplying an operating voltage, and may further include an application chipset, a graphic-related module, a camera image processor, and a DRAM. Other elements would be obvious to a person skilled in the art.

The memory system 100 may include not only a device configured to store data in a magnetic disk such as a hard disk drive (HDD), but also a device configured to store data in a nonvolatile memory such as a solid state drive (SSD), a universal flash storage device, or an embedded MMC (eMMC) device. The non-volatile memory may include a read only memory (ROM), a programmable ROM (PROM), an electrically programmable ROM (EPROM), an electrically erasable and programmable ROM (EEPROM), a flash memory, a phase-change RAM (PRAM), a magnetic RAM (MRAM), a resistive RAM (RRAM), a ferroelectric RAM (FRAM), and the like. In addition, the memory system 100 may be implemented as storage devices of various types and mounted inside various electronic devices.

Based on embodiments of the disclosed technology described above, the operation delay time of the memory system may be reduced or minimized. In addition, the disclosed technology can be implemented in a way that reduces or minimizes an overhead occurring in the process of calling a specific function. Although various embodiments of the disclosed technology have been described for illustrative purposes, various modifications, additions and substitutions of the disclosed embodiments and other embodiments are possible based on what is described and illustrated in this patent document.

What is claimed is:

1. A memory system comprising:
   a memory device structured to store data; and
   a memory controller in communication with the memory device and configured to control the memory device,
   wherein the memory controller comprises:
   a map cache including N cache lines configured to cache map data, wherein each of the N cache lines includes M data units, N and M being positive integers equal to or greater than 2; and
   a cache line control circuit in communication with the map cache and configured to control N flag sets corresponding to the N cache lines, wherein each of the N flag sets includes M flags, each flag indicating whether or not a cache hit for indicating a particular piece of data being stored in the map cache has been made for each of the M data units included in a corresponding cache line,
   wherein the cache line control circuit is further configured to determine whether to cache target map data based on a number of flags indicating the cache hit for a corresponding data unit and included in a first flag set corresponding to a first cache line among the N cache lines,
   wherein the cache line control circuit is further configured to control K flag sets corresponding to K cache lines in parallel, whereby K is a natural number less than or equal to N, and
   wherein K is determined based on a number of types of map data that is cached in the N cache lines and a number of instances to access the N cache lines.

2. The memory system of claim 1, wherein the cache line control circuit is further configured to read the target map data from the memory device and cache the target map data in a second cache line among the N cache lines.

3. The memory system of claim 2, wherein the cache line control circuit is further configured to cache the target map data in the second cache line in a case that the number of flags is equal to or greater than a threshold.

4. The memory system of claim 3, wherein the target map data has an address having a value obtained by adding a size of the first cache line to an address of the map data cached in the first cache line.

5. The memory system of claim 1, wherein each flag has a first value indicating that the cache hit has been occurred for the corresponding data unit or a second value indicating that the cache hit has not been occurred for the corresponding data unit.

6. The memory system of claim 5, wherein the cache line control circuit is configured to determine a number of flags in the flag set that simultaneously have the first value based on a size of a data access unit for the map cache.

7. The memory system of claim 1, wherein the cache line control circuit is further configured to skip caching of the target map data in a case that the target map data is previously cached in the map cache.

8. The memory system of claim 1, wherein the types of the map data includes an L2V data type indicating a mapping relationship between a logical address and a virtual address or a VPT data type indicating a validity of an area indicated by the map data.

9. The memory system of claim 1, wherein the cache line control circuit includes a flag set cache for caching flag sets for the K cache lines.

10. An operating method of a memory system, comprising:
    checking N flag sets corresponding to N cache lines each of which configured to cache map data and include M data units, wherein each of the N flag set contains M flags and each of the M flags indicates whether or not a cache hit for indicating a particular piece of data being stored in the map cache has been made for each of the M data units included in a corresponding cache line, N and M being positive integers equal to or greater than 2;
    determining whether to cache target map data based on a number of flags indicating the cache hit for a corresponding data unit and included in a flag set corresponding to a first cache line among the N cache lines; and
    performing caching the target map data in a second cache line among the N cache lines or skipping caching of the target map data,
    wherein the checking of the N flag sets comprises checking K flag sets corresponding to K cache lines in parallel, whereby K is a natural number less than or equal to N, and
    wherein K is determined based on a number of types of map data that is cached in the N cache lines and a number of instances to access the N cache lines.

11. The operating method of claim 10, wherein the performing of the caching includes reading the target map data from a memory device when the number of flags in the flag set corresponding to the first cache line is equal to or greater than a threshold.

12. The operating method of claim 11, wherein the target map data has an address value that is a subsequent to an address of the map data cached in the first cache line.

13. The operating method of claim 10, wherein each flag has a first value indicating that the cache hit has been occurred for the corresponding data unit or a second value indicating that the cache hit has not been occurred for the corresponding data unit.

\* \* \* \* \*